United States Patent [19]

Le Fevre et al.

[11] Patent Number: 5,262,143
[45] Date of Patent: Nov. 16, 1993

[54] PRODUCTION OF FINELY DIVIDED PARTICULATE SILICEOUS MATERIAL BY DECOMPOSITION OF ALKALI METAL SILICATE WITH SULFITIC SPECIES

[75] Inventors: Gerard Le Fevre; Fraser McLellan, both of Oakville; Graham R. Hagens, Hamilton, all of Canada

[73] Assignee: National Silicates Ltd., Toronto

[21] Appl. No.: 896,380

[22] Filed: Jun. 10, 1992

[30] Foreign Application Priority Data

Jun. 14, 1991 [CA] Canada ................. 2044644

[51] Int. Cl.$^5$ ................. C01B 33/193; C01B 33/20
[52] U.S. Cl. ................. 423/328.1; 423/335; 423/566.3; 423/519.2; 252/188.21; 252/192
[58] Field of Search ............ 423/335, 339, 328.1, 423/331, 512 A, 566.2, 566.3; 252/188.21, 192

[56] References Cited

U.S. PATENT DOCUMENTS

| | | | |
|---|---|---|---|
| Re. 30,568 | 4/1981 | Fitton | 106/306 |
| 2,996,358 | 8/1961 | Milton | 23/113 |
| 3,011,869 | 12/1961 | Breck et al. | 23/113 |
| 3,012,853 | 12/1961 | Milton | 23/113 |
| 3,582,379 | 6/1971 | Hackbarth et al. | 106/288 B |
| 3,746,559 | 7/1973 | Hackbarth et al. | 106/288 B |
| 3,784,442 | 1/1974 | Hackbarth et al. | 162/181 C |
| 3,798,046 | 3/1974 | Fitton | 106/306 |
| 3,915,734 | 10/1975 | Fitton | 106/306 |
| 3,928,540 | 12/1975 | Morgan | 423/339 |
| 4,421,726 | 12/1983 | Nikolai | 423/242 |

FOREIGN PATENT DOCUMENTS 939112 1/1974 Canada.
2048923 12/1980 United Kingdom.

*Primary Examiner*—Olik Chaudhuri
*Assistant Examiner*—Ken Horton
*Attorney, Agent, or Firm*—Ridout & Maybee

[57] ABSTRACT

Production of siliceous precipitates, for example sodium aluminosilicates by decomposition of an alkali metal sulfite solution with a solution of a sulfitic species such as sulfur dioxide, sulfurous acid or a salt thereof. Precipitates having excellent properties are obtained and the co-produced aqueous phase is a solution of alkali metal sulfite which has utility in pulp and paper mills. The process is advantageously carried out in proximity to a pulp and paper making operation wherein the siliceous precipitate may be used as a paper making filler and the alkali metal sulfite solution may be used in the pulping process.

6 Claims, No Drawings

PRODUCTION OF FINELY DIVIDED PARTICULATE SILICEOUS MATERIAL BY DECOMPOSITION OF ALKALI METAL SILICATE WITH SULFITIC SPECIES

FIELD OF THE INVENTION

This invention relates to the production of finely divided siliceous particulate materials produced by the reaction of alkali metal silicates with acids or the salts thereof. Examples of such siliceous materials include precipitated silica, precipitated silicates, sodium aluminosilicates, synthetic zeolites, sodium magnesium aluminosilicates and the like. Such precipitates find wide usage as water softeners, reinforcers for rubber products and as fillers in the manufacture of paper.

DESCRIPTION OF THE RELATED ART

The production of precipitated silicas and silicates from alkali metal silicates and strong acids or the salts of strong acids, is well known in the art. Examples are disclosed in U.S. Pat. Nos. 2,996,358; 3,011,869; 3,012,853; 3,582,379; 3,746,559; 3,748,442; 3,798,046 and 3,915,734. A disadvantage in the production of precipitated silicates from alkali silicate and strong acids and their salts is the formation of low value by-products in dilute aqueous solution. These by-products are most commonly salts of sodium such as sodium sulfate or sodium chloride. Although little mention is made of by-product in the teachings cited, the disposal of these waste streams is an increasingly burdensome cost component in the manufacture of precipitated silicates.

SUMMARY OF THE INVENTION

The present invention involves a method of producing precipitated silica, alkali aluminosilicates and like siliceous precipitates. More particularly it relates to a method of preparing such precipitates in such way that their properties are at least equal to precipitates produced in the conventional manner, while minimizing the cost of manufacture. In this regard there has been developed a novel method of precipitation that has particular use in providing precipitates with good properties, and complete elimination of the cost of by-product disposal. At the same time the cost of manufacture is significantly reduced.

The present invention provides a method for the production of finely divided particulate siliceous material wherein a solution of an alkali metal silicate is decomposed by reaction with sulfur dioxide, a solution of sulfurous acid or a salt thereof to yield a finely divided particulate precipitate and a solution of an alkali metal sulfite or bisulfite.

In the present invention considerable advantages are achieved through the use of sulfur dioxide, sulfurous acid and salts thereof. To better understand the remarkable synergy, it is necessary to explain that one of the more important industrial applications for siliceous precipitates is as a filler of paper which is manufactured from mechanical pulp. The production of bleached mechanical pulp such as thermo mechanical and chemi thermo mechanical pulps employ among other chemicals, sulfurous acid and sodium sulfite. Sulfurous acid is used to reduce the alkalinity of certain liquors, while sodium sulfite is used in the pretreatment of wood chips prior to pulping. The sodium sulfite required is produced by neutralizing sulfurous acid with sodium hydroxide, the purchase of which adds further cost to the production of pulp. Other producers of bleached mechanical pulps use the salts of sulfurous acid as reagents for the manufacture of sodium hydrosulfite in what is commercially known as the "Borol Process".

In the use of the present invention considerable advantages are realized from the fact that major consumers of aluminosilicate and like precipitates have at hand not only one of the starting materials for the process but also a demand for the co-product. This process has therefore the potential to be uniquely valuable when production of precipitated silicates is carried out close to a pulp and paper mill. It is towards the use of this process in such pulp and paper mills that the present invention is primarily directed. It is also recognized that this process will have application in reducing the production costs of other commercial manufacturing facilities which are dedicated to the manufacture of alkali sulfite and bisulfite. The co-production of precipitated silicates and alkali sulfites using this process would allow a reduction in the production cost of the sulfite, at the same time eliminating the need to dispose of troublesome by-product.

Prior to the discovery of this process it was thought that expensive disposal of wasteful by-product could not be avoided. The new process and products have therefore considerable economic advantages in the area of raw material supply and waste product disposal over similar processes. In addition to this applicants have discovered that the materials produced in this process have physical properties at least equal to or superior to those of precipitates obtained in the conventional manner.

In one advantageous form of the present invention, the alkali metal silicate solution is decomposed with a solution of aluminum sulfite yielding an alkali metal aluminosilicate precipitate and an aqueous phase containing alkali metal sulfite or bisulfite, depending on the final pH of the reaction.

In another advantageous form, the alkali metal silicate solution is decomposed with a solution of alkali metal aluminate in the presence of sulfur dioxide or a solution of sulfurous acid to yield an alkali metal aluminosilicate precipitate and an aqueous phase containing alkali metal sulfite, in which case the aluminum sulfite reagent is formed in situ during the reaction.

In other advantageous forms, the alkali metal silicate is reacted with sulfurous acid or sulfur dioxide without the presence of aluminum, to yield precipitated silica and a solution of alkali metal sulfite or bisulfite.

As will be appreciated by those of ordinary skill in the art, in the case in which a solution is reacted with sulfur dioxide such reaction is conducted by bubbling sulfur dioxide into the solution. The intermediate water-sulfur dioxide system so formed is commonly referred to as "sulfurous acid".

In further advantageous forms, the alkali metal silicate is reacted with a sulfite salt of a metal other than aluminum, for example an alkaline earth metal salt such as magnesium sulfite, leading to precipitated magnesium silicate which has utility as a filler and alkali metal sulfite solution which has the above-noted commercial uses. In each case, the above-noted advantages are realized of generation of a siliceous precipitate together with an alkali metal sulfite solution having industrial applicability and an economic value.

Moreover, the present method may be modified, by conducting the reaction in the presence of alkali metal sulfite which is present from the inception of the reaction, and by conducting the reaction in the presence of alkaline earth metal hydroxide solution, in order to improve the properties of the precipitated siliceous product.

The present invention will be better understood from the following detailed description.

DESCRIPTION OF PREFERRED EMBODIMENTS

In accordance with one aspect of the present invention, alkali metal aluminosilicate pigments are prepared by introducing dilute solutions of an alkali metal silicate and dilute solutions of aluminum salts in sulfurous acid into an aqueous reaction medium, the acidic solutions being preferably prepared beforehand by the dissolution of aluminum trihydrate in sulfurous acid or by the reaction of solutions of alkali metal aluminates with sulfurous acid.

The products of this reaction are compositions containing the oxides of an alkali metal, aluminum and silicon, the formation of which may be represented by the following general formula, in which the ubiquitous presence of water is for the most part ignored:

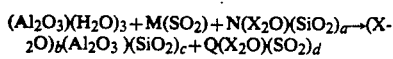

wherein M is the number of moles of sulfurous acid required, Q is the number of moles of alkali metal sulfite produced, N is the number of mols of alkali metal silicate required for the reaction and X is an alkali metal such as sodium or potassium. The letter "a" represents the mol ratio of silica to alkali metal oxide in the alkali silicate, "b" and "c" represent the mols of the oxides present in the composition of the precipitate. The ratio of $SO_2$ to $Na_2O$ in the co-product, "d", will generally be between 1 and 2 depending on whether the sulfite or bisulfite species predominate. It will be recognized by those skilled in the art that certain of these ratios are related such that $aN=c$, $b+Q=N$ and $dQ=M$ etc.

Examples of alkali metal silicates include sodium and potassium silicate. Most commonly the preferred alkali metal silicate is that of sodium in which the ratio of silica to sodium oxide ("a" in the formula above) is usually anywhere between 0.5 and 3.5. The best economics are however achieved when the concentration of silica is relatively high, so that there is increased production of precipitate per unit volume of aqueous phase. Preferably therefore, the ratio "a" is that of the highest available commercial product which is in the range 3.2 to 3.4. The molar ratio of the constituent oxides in the precipitate can vary widely. In the case of sodium oxide ("b" above), it is usually close to 1, such as about 0.5 to 1.5 moles of $Na_2O$. The mol ratio $SiO_2$ to $Al_2O_3$ ("c" above) can be as low as about 2 but may also be very high. The ratio approaches or becomes infinity as the concentration of aluminum in the sulfurous acid becomes very small or zero, at which time the precipitate approaches the composition of precipitated silica, in which product metal oxides are entirely absent.

Preferably, the ratio of silica to alumina is between about 8 and about 100. As is demonstrated in the Examples below, especially good results can be achieved when the ratio of silica to alumina is between about 10 and about 30, and therefore this ratio is more preferred. Even more preferably, the ratio is between about 15 and about 25. Since as given above $c=aN$, and the preferred value of "a" is 3.3, it follows that optimum products are obtained when the mol ratio of sodium silicate to alumina ("N") is between about 4.5 and about 7.5.

In a first embodiment of the present invention, wherein aluminosilicate is to be precipitated, a solution of aluminum oxide in sulfurous acid is first prepared. This is preferably accomplished by dissolution of aluminum trihydrate in sulfurous acid. Preferably, the aluminum sulfite solution prepared is dilute, and the reaction is preferably carried out by simultaneous addition of the dilute solution of aluminum sulfite and a dilute solution of the alkali metal silicate into an aqueous medium containing the sodium or other alkali metal silicate. The reaction mixture is preferably continuously stirred or agitated throughout the reaction so as to keep the dispersion in a fluid condition. The alkali metal silicate solutions so used should preferably be less than about 8 molar, still more preferably less than about 4 molar, and the concentration of the solution of the aluminum and sulfurous acid (or of dissolved sulfur dioxide calculated as sulfurous acid) should together preferably be less than about 6 molar, more preferably less than about 2 molar, in order to obtain precipitates having particularly advantageous physical properties of pigment brightness and oil absorption.

The reaction may be carried out under varying conditions of pH, temperature, concentration, manner of feeding and the like in order to obtain precipitates of varying physical properties. By selection of particular conditions of pH, temperature, concentration, manner of feeding, and the like, as will be appreciated by those skilled in the art, precipitates of selected physical properties can be obtained and adapted for use in highly specialized needs. Generally, the conditions employed for the reaction may be similar to those employed in the conventional precipitation processes employing aluminum salts of strong acids, or strong acids themselves, as described, for example in the U.S. patents mentioned above. Preferably, in order to obtain precipitates having improved physical properties, the average concentration of the reactants in the reaction mass is less than about 4 molar. By "average concentration" is meant the total number of moles of the reactants present in the reaction mass divided by the total volume of the reaction mass. More preferably, the average concentration is maintained at less than about 2 molar. At the end of the reaction, the product is a fluid mass from which the precipitated solid product can be easily separated.

Preferably, the addition of the silicate solution and the aluminum sulfite to the reactor are started simultaneously or a portion of the silicate solution is added prior to the addition of the aluminum salt solution. For ease of control and operation of the process, the reaction may be carried out as a batch process wherein the reactant solutions are mixed and agitated together within a batch reactor vessel. Alternatively, the reactant solutions may be reacted together continuously, in continuous reactor apparatus of any of the conventional types. For example, the reactant solutions may be flowed through a continuous line equipped internally with mixing devices, for example motionless mixer vanes, the flow rate and the length of line being selected to enable complete reaction to take place.

Whether the process is conducted in a batch reactor vessel or continuously, in order to obtain precipitates having improved properties, the pH of the reaction mixture is preferably maintained between about 8 and about 10, more preferably about 8.5 to about 9.5, up to the point at which no further silicate solution is added. Control of the pH can be conducted in the conventional manner, employing pH sensitive probes in contact with the reaction mixture, and controlling the addition of the reactant solutions manually or automatically in response to the pH of the reaction mixture. Once all the alkali silicate solution has been added, the addition of the acid aluminum sulfite solution may then be continued preferably until the pH is reduced to between about 7 and 9.

Upon completion of the reaction procedure, the precipitated filler or pigment is usually separated from the reaction liquid by filtration, but other means such as centrifuging can be used. In general it is preferable to wash the separated pigment with water both in order to increase its purity and to improve the efficiency in the recovery of the co-produced alkali metal sulfite. The filtrate, supernatant or other liquid phase containing the alkali metal sulfite is collected together with the washings and transferred for use preferably in a pulp mill or to another suitable consumer as referred to above. The remaining filter cake is then preferably milled to a desired particle size using a media mill, or similar equipment to reduce particle size as is known in the art, and transferred to the end user, for example to a paper machine, with or without further processing such as drying.

When the precipitation was carried out as described, it is found that the precipitates are at least equal in certain aspects to conventional aluminosilicates. The properties are demonstrated in the Examples given below in which comparison is made between a premium commercial sodium aluminosilicate prepared in a conventional batch process ("Hydrex"), and the product obtained using sodium silicate and aluminum sulfite.

While brightness is one of the most important properties of synthetic paper fillers, another of particular interest is that described as "oil absorption". The number of grams of oil which 100 gms of filler is observed to absorb under laboratory conditions closely relates to the printability of paper which is manufactured using these fillers. Good oil absorption reduces the extent to which ink shows through on the reverse side of a printed sheet. On the other hand oil absorption can sometimes be too high in which case ink "rub-out" occurs and the printing on the paper is adversely affected. According to those skilled in the art of papermaking, the preferred oil absorption is between 60 and 350 gms of oil per 100 gms of filler, with the optimum somewhere around 100-300.

While the Examples given serve to illustrate the present invention, it is expressly understood that they are not intended to limit it thereto. Various modifications are possible within the scope of the present invention. One of ordinary skill in the art may readily modify the processes described in the Examples given below in order to carry out such modifications. For example, as noted above, the invention includes use of sulfur dioxide or sulfurous acid without the presence of aluminum, in the course of which the same advantages in the use of alkali metal sulfite may be realized. In a similar way, the invention includes conducting the reaction in the presence of a calculated quantity of by-product sodium or other alkali metal sulfite from the outset of the reaction, whereby refined modifications in the characteristics of the final materials become available as is taught in the art in the known processes for production of siliceous precipitates using strong acids. Further, the invention includes incorporation of alkali earth oxides in the structure of the precipitate, as also taught in the art in connection with the use of strong acids, as a method of improving product properties. In addition, the invention includes precipitation of alkali metal silicates with the soluble sulfite of other metals such as alkaline earth metals, for example magnesium, which reaction would lead to precipitated alkaline earth metal or magnesium silicate and sodium or other alkali metal sulfite. In addition, the invention includes the precipitation of alkali metal silicates with acids or their salts onto the surface of other filler materials such as mineral clays, titanium dioxide and such, as a means of improving the performance properties of these materials. As noted above, these modifications are in themselves generally well known to those skilled in the art in association with the known processes for producing siliceous precipitates using acids and their metal salts. Therefore one skilled in the art has no difficulty in modifying the present process in similar manner.

EXAMPLE 1

A dilute solution of 0.54 moles aluminum sulfite was first prepared by bubbling a stream of sulfur dioxide into a suspension of 84 gms freshly precipitated aluminum trihydrate (ATH) in 1500 mls of water at 10°–15° C. until the ATH was completely dissolved and the solution was clear. It may be noted that the freshly precipitated ATH was prepared by reacting a solution of sodium aluminate with sulfur dioxide.

A dilute alkali silicate solution was then prepared by dissolving 1000 gms commercial sodium silicate (38% strength $Na_2O.3.3SiO_2$ containing 380 gms or 1.45 moles sodium silicate which include 290 gms or 4.833 moles $SiO_2$) in 500 ml of water.

A 5 liter reactor provided with a propeller type agitator blade was charged with 1.7 liters of water to which was added sodium silicate solution as a thin stream. The addition of the sodium silicate was continued until the pH of the reaction was 9.9. Thereafter, and with the silicate solution still being introduced, the acid aluminum sulfite solution was introduced for a period of 130 minutes. The pH during the simultaneous addition of the silicate solution and the aluminum salt was controlled at about 9.2. At the end of the 130 minute reaction period all the silicate solution had been added. Thereafter the addition of the aluminum sulfite solution was continued until the final pH of the reaction mass was 7.0. The temperature of the reactants introduced into the reaction vessel as well as the receiving medium was maintained at about 70° C. throughout the reaction. After the pH of the reaction mass was reduced, agitation of the reaction mass was continued for an additional 15 minutes. At the end of this process the volumes of each reactant consumed was such that the ratio of silica to alumina was 8.10:0.54 = 15.0:1.0.

The precipitate was then separated by filtration and washed with water at ambient temperature. The resulting filter cake which was found to have a consistency of 26% solids was processed through a laboratory liquid blender. The material so produced was a suspension of a finely divided white particulate made up of particles of average size 2.0 microns in diameter as measured in a Sedigraph 5100 particle analyzer. The specific gravity of the product was 2.1. The filtrate combined with wash water, consisted of a solution of sodium sulfite at a concentration of about 2% by weight.

EXAMPLE 2

A dilute solution of 0.2 moles aluminum sulfite was first prepared by bubbling a stream of sulfur dioxide into a solution of sodium aluminate (5% Al2O3). A dilute alkali silicate solution was then prepared by dissolving 1000 gms commercial sodium silicate (38% strength $Na_2O.3.3SiO_2$ containing 380 gms or 1.45 moles sodium silicate which include 290 gms or 4.833 moles $SiO_2$) in 500 ml of water.

A 5 liter reactor provided with a propeller type agitator blade was charged with 1.5 liters of water to which was added sodium silicate solution as a thin stream. The addition o± the sodium silicate was continued until the pH of the reaction was 9.9. Thereafter, and with the silicate solution still being introduced, the acid aluminum sulfite solution was introduced for a period of 100 minutes. The pH during the simultaneous addition of the silicate solution and the aluminum salt was controlled at about 9.2. At the end of the 100 minute reaction period all the silicate solution had been added up to reach pH:10.0. The temperature of the reactants introduced into the reaction vessel as well as the receiving medium was maintained at about 70° C. throughout the reaction. After the pH of the reaction mass was reduced, agitation of the reaction mass was continued for an additional 15 minutes. At the end of this process the volumes of each reactant consumed was such that the ratio of silica to alumina was 22.0:1.0.

The precipitate was then separated by filtration and washed with water at ambient temperature. The resulting filter cake which was found to have a consistency of 26% solids was processed through a laboratory liquid blender. The material so produced was a suspension of a finely divided white particulate made up of particles of average particle size 2.8 microns in diameter as measured in a Sedigraph 5100 particle analyzer. The specific gravity of the product was 2.1 The filtrate combined with wash water, consisted of a solution of sodium sulfite at a concentration of about 2% by weight.

EXAMPLE 3

A saturated solution of sulfurous acid was prepared by bubbling a stream of sulfur dioxide into 800 ml of water at 20° C.

A dilute alkali silicate solution was then prepared by dissolving 870 gms commercial sodium silicate (38% strength $Na_2O.3.3SiO_2$ containing 331 gms or 1.26 moles sodium silicate which include 252 gms or 4.21 moles $SiO_2$) in 440 mls of water.

A 5 liter beaker provided with a propeller type agitator blade was charged with 1.7 liter of water to which was added 40 gms sodium sulfite. Sodium silicate solution was added to the solution as a thin stream until the pH of the reaction was 9.9. Thereafter, and with the silicate solution still being introduced, the sulfurous acid solution was introduced for an additional period of 130 minutes. The pH during the simultaneous addition of the silicate solution and the sulfurous acid was controlled at about 9.3. At the end of the reaction period all the silicate solution had been added. Thereafter the addition of the sulfurous acid solution was continued until the final pH of the reaction mass was 7.4. The temperature of the reactants introduced into the reaction vessel as well as the receiving medium was maintained at about 73° C. throughout the reaction. After the pH of the reaction mass was reduced, agitation of the reaction mass was continued for an additional 15 minutes.

The precipitate was then separated by filtration and washed with water at ambient temperature. The resulting filter cake which was found to have a consistency of 24% solids was processed through a laboratory liquid blender as previously described. The filtrate consisted of a solution of sodium sulfite or bisulfite species at the concentration of about 6% by weight.

In the Table below some properties of the materials obtained are compared to those of three typical commercially available sodium aluminosilicates "Hydrex", "Huberfil 96" and "Pasilex" and a typical commercial precipitated silica "VP 406".

TABLE 1

CHEMICAL PHYSICAL PROPERTIES OF PIGMENTS PREPARED FROM SODIUM SILICATE, ALUMINUM SULFITE AND SULFUROUS ACID

| Pigment | Pigment Brightness | Oil absorption ml/100 gm | Particle Size (Av) Microns |
|---|---|---|---|
| Example 1 | 97.3 | 160 | 2.0 |
| Example 2 | 98.9 | 180 | 2.8 |
| Example 3 | 98.6 | 200 | 19.0 |
| Controls Supplier | | | |
| "Hydrex"* | 98.0 | 125 | 1–2 |
| "Huberfil 96"* | 94.0 | 120 | 2–3 |
| "VP406"** | 98.0 | 210 | 2–5 |
| "Pasilex"*** | 99.0 | 170 | 1 |

*Trademark of the J. M. Huber Corporation
**Trademark of Akzo NPV.
***Trademark of Degussa GMBH

We claim:

1. A method for the production of finely divided particulate siliceous material comprising reacting a solution of an alkali metal silicate with a sulfitic species wherein said sulfitic species is selected from the group consisting of sulfur dioxide, sulfurous acid, salts of sulfurous acid and mixtures thereof to decompose said solution of an alkali metal silicate and yield a finely divided particulate siliceous precipitate and a solution of an alkali metal sulfite, wherein said silicate and said sulfitic species are reacted together in the presence of alkali metal sulfite solution which is present from the inception of the reaction.

2. A method for the production of finely divided particulate siliceous material comprising reacting a solution of an alkali metal silicate with a sulfitic species wherein said sulfitic species is selected from the group consisting of sulfur dioxide, sulfurous acid, salts of sulfurous acid and mixtures thereof to decompose said solution of an alkali metal silicate and yield a finely divided particulate siliceous precipitate and a solution of an alkali metal sulfite, wherein said salt is a metal sulfite.

3. A method according to claim 2 wherein said sulfite is an alkaline earth metal sulfite.

4. A method according to claim 2 wherein said sulfite is aluminum sulfite.

5. A method according to claim 4 wherein the molar ratio of said silicate (calculated as $SiO_2$) to aluminum sulfite (calculated as $Al_2O_3$) is between about 2 and infinity.

6. A method according to claim 5 wherein said ratio is between about 8 and about 100.

* * * * *